United States Patent [19]

Krause et al.

[11] Patent Number: 5,093,720

[45] Date of Patent: Mar. 3, 1992

[54] MOTION COMPENSATION FOR INTERLACED DIGITAL TELEVISION SIGNALS

[75] Inventors: Edward A. Krause, San Diego; Woo H. Paik, Encinitas; Vincent Liu; James N. Esserman, both of San Diego, all of Calif.

[73] Assignee: General Instrument Corporation, Hatboro, Pa.

[21] Appl. No.: 570,157

[22] Filed: Aug. 20, 1990

[51] Int. Cl.[5] .......................... H04N 7/12; H04N 7/00
[52] U.S. Cl. .................................. 358/133; 358/135; 358/136; 358/105
[58] Field of Search ................. 358/133, 135, 136, 12, 358/140, 105

[56] References Cited

U.S. PATENT DOCUMENTS

| 4,651,206 | 3/1987 | Ohki | 358/105 |
| 4,862,264 | 8/1989 | Wells et al. | 358/136 |
| 4,897,720 | 1/1990 | Wu et al. | 358/135 |
| 4,933,759 | 6/1990 | Van der Meer et al. | 358/105 |

OTHER PUBLICATIONS

"A Motion Compensated Interframe Coding Scheme for Television Pictures", Ninomiya and Ohtsuka, *IEEE Transactions on Communications*, vol. COM-30, No. 1, Jan. 1982.

"Fixed and Adaptive Predictors for Hybrid Predictive/Transform Coding", Ericsson, *IEEE Transactions on Communications*, vol. COM-33, No. 12, Dec. 1985.

*Primary Examiner*—James J. Groody
*Assistant Examiner*—Michael M. Lee
*Attorney, Agent, or Firm*—Barry R. Lipsitz

[57] ABSTRACT

Motion compensated coding of interlaced digital video signals is provided. Pixel data from successive interlaced video fields is compared to similarly situated pixel data in a plurality of previous fields to find a preferred counterpart for each current field set of pixel data. A prediction error signal is generated for each current field set of pixel data indicative of the difference between it and its preferred counterpart from a previous field. Each prediction error signal is encoded with data indicative of the previous field in which the preferred counterpart can be found. In a preferred embodiment, each set of current field pixel data is compared to a range of similarly situated pixels in each of the previous fields, and the prediction error signal is also encoded with motion vector data indicative of the location of the preferred counterpart in its previous field.

38 Claims, 7 Drawing Sheets

MOTION COMPENSATION FOR INTERLACED DIGITAL TELEVISION SIGNALS

BACKGROUND OF THE INVENTION

The present invention relates to the compression of digital data, and more particularly to a method and apparatus for providing motion compensation for an interlaced digital television signal.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is used to transmit only the difference between an actual frame and a prediction of the actual frame. The prediction is based on information derived from a previous frame of the same video sequence. Examples of such systems can be found in Ninomiya and Ohtsuka, "A Motion-Compensated Interframe Coding Scheme for Television Pictures", *IEEE Transactions on Communications*, Vol. COM-30, No. 1, January 1982 and Ericsson, "Fixed and Adaptive Predictors for Hybrid Predictive/Transform Coding", *IEEE Transactions on Communications*, Vol. COM-33, No. 12, December 1985, both incorporated herein by reference.

In motion compensation systems of the type disclosed in the referenced articles, motion vectors are always derived by comparing a block of pixel data from a field of a current frame to similar blocks in the same field of the previous frame. A motion estimator determines how the corresponding motion vector in the previous field should be adjusted in order to be used in the current field. Although this system can effectively reduce the amount of data to be transmitted, optimum performance is not achieved.

It would be advantageous to provide a motion compensation system for interlaced digital television signals in which a greater degree of data compression can be achieved. The present invention provides such a system.

SUMMARY OF THE INVENTION

In accordance with the present invention, highly efficient motion compensated coding is provided for interlaced digital video signals. Successive interlaced video frames are subdivided into blocks of odd field pixel data and even field pixel data. The odd field blocks and even field blocks of a first video frame are stored in memory after further processing including compression and decompression. Each block of pixel data from a subsequent second video frame is compared before compression to similarly situated blocks in both the odd and even fields of the first video frame. A preferred first frame counterpart (e.g., the best match) for each second frame block is determined. A prediction error signal is generated for each second frame block indicative of the difference between the block and the odd or even first frame block it matches best. Each prediction error signal is encoded with a motion vector indicative of the location in the first video frame where the best match was found. In the event the best match is found when there is no displacement between the current and previous frame blocks, the motion vector will be zero.

In a preferred embodiment, each second frame block is compared to a range of similarly situated pixels in both the odd and even fields of the first video frame. The motion vector data appended to the prediction error signals identifies the location of a block within the range at which the best match was found.

Decoder apparatus is provided for decoding motion compensated interlaced digital video signals. Memory means stores odd field and even field pixel data for a first video frame. Means are provided for receiving motion compensated blocks of odd field pixel data and motion compensated blocks of even field pixel data for a second video frame. Each of the second frame blocks has a motion vector appended thereto relating the block to corresponding pixel data in the first video frame. Means responsive to the motion vectors retrieve odd field or even field pixel data from the memory means for each odd field second frame block. Means responsive to the motion vectors are also provided for retrieving odd field or even field pixel data from the memory means for each even field second frame block. The retrieved first frame pixel data is added to the corresponding second frame block to reconstruct full blocks of pixel data defining the second video frame. The reconstruction of each second frame block is not limited to the use of first frame pixel data from the same field as the block being reconstructed.

In another embodiment, a method and apparatus are provided for motion compensated coding of digital video signals. A set of pixel data from a current video field is compared to a similarly situated set of pixel data from each of a plurality of previous video fields to find a preferred counterpart for the current set from one of the previous fields. A prediction error signal is generated for the current set of pixel data indicative of the difference between the current set and its preferred counterpart. The prediction error signal is encoded with data indicative of the previous field in which the preferred counterpart is located. The current set of pixel data can be compared over a range of similarly situated pixels in each previous field to find the preferred counterpart. The resultant prediction error signal is encoded with motion vector data indicative of the preferred counterpart's location within its field.

Decoder apparatus is provided having memory means for storing pixel data from each of a plurality of prior video fields. A motion compensated set of pixel data is received for a current video field having a field identifier appended thereto relating the received set to a predetermined counterpart in one of the plurality of prior video fields. In response to the field identifier, the counterpart is retrieved from the memory means. A full set of pixel data is then reconstructed from the motion compensated set of pixel data and the retrieved counterpart to define a current video field portion. Since the memory means stores data from a plurality of prior fields, successive full sets of pixel data can be reconstructed from successive current field motion compensated sets having respective counterparts in different prior video fields.

DETAILED DESCRIPTION OF THE INVENTION

Television signals comprise a plurality of horizontal lines that are scanned to form an image. For various reasons well known in the art, the signal is separated into an odd field and an even field, and the odd and even field lines are interleaved to provide a proper picture.

Figure 1:
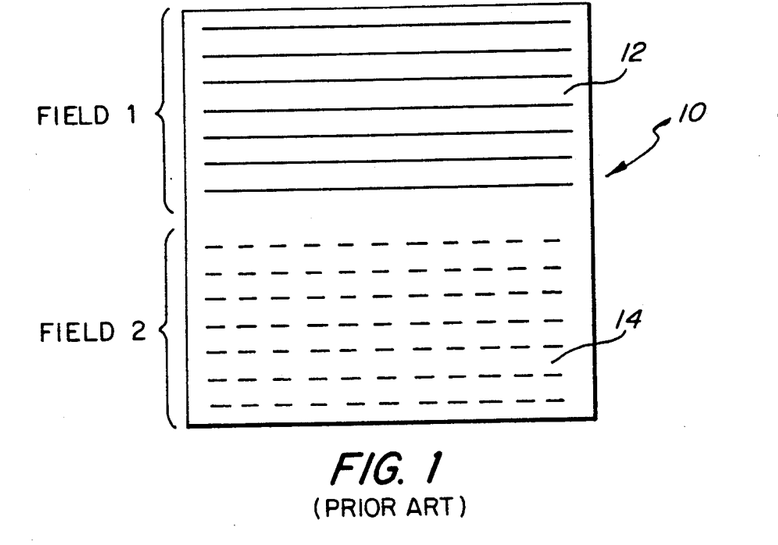
FIG. 1 is an illustration depicting a video frame separated into fields containing odd and even lines of video information.

FIG. 1 illustrates a single video frame 10 separated into its two component fields. Field 1 designated by reference numeral 12 comprises the odd lines of the video frame. Field 2 represented by reference numeral 14 comprises the even lines of the video frame.

Figure 2:
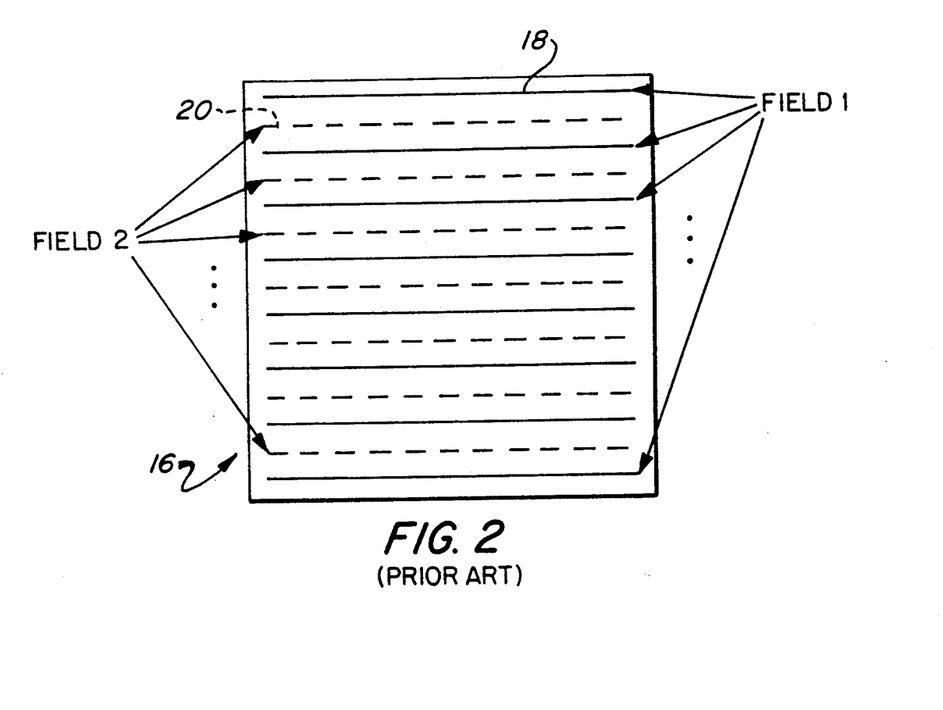
FIG. 2 is a diagram illustrating a video frame wherein the odd and even lines of video information are interleaved to provide an intelligible picture.

An interlaced video frame 16 is depicted in FIG. 2. Odd lines 18 from field 1 are interleaved with even lines 20 from field 2. The even and odd lines must be interleaved in this fashion in order to provide an intelligible television picture.

The present invention concerns digitally transmitted data. In digital television systems, each line of a video frame is defined by a sequence of pixels. Due to the large amount of pixel data that must be transmitted to define the picture in a television program, it is desirable to compress the data prior to transmission. In one compression technique, motion compensation is used to predict the data for a current frame from data of a previous frame. As used herein, the term "motion compensation" includes the case where the previous frame is used for a prediction, but there is no displacement between the current and previous frame portions of an image being compared for the prediction. In such cases, the motion vector will be zero.

In motion compensation systems, only the data representing the difference between the predicted signal and the actual signal is compressed and encoded for transmission. Most prior art motion compensation techniques are not designed for use with interlaced television signals. Such prior art techniques compare an area of pixels from a current frame to pixels in the same area of the previous frame. Efforts to extend motion compensation to interlaced signals have generally taken the same approach, wherein pixels from the odd field of a current frame are compared to pixels from the odd field of the prior frame and pixels from the even field of the current frame are compared to pixels from the even field of the prior frame. This approach of consistent field-to-field comparison is not particularly efficient, particularly when there is vertical motion in the television picture.

In accordance with the present invention, current frame pixel data is compared to similarly situated pixel data in both fields of the prior frame in order to find a preferred counterpart for the current frame data. The preferred counterpart is generally the one that will provide the easiest to compress error signal, and may comprise, for example, the current and prior frame set of pixel data having the best overall match. The term "best match" is used herein to mean the current and previous blocks of data that have the lowest mean square error between them. Other types of preferred counterparts are discussed in greater detail below.

Figure 3:
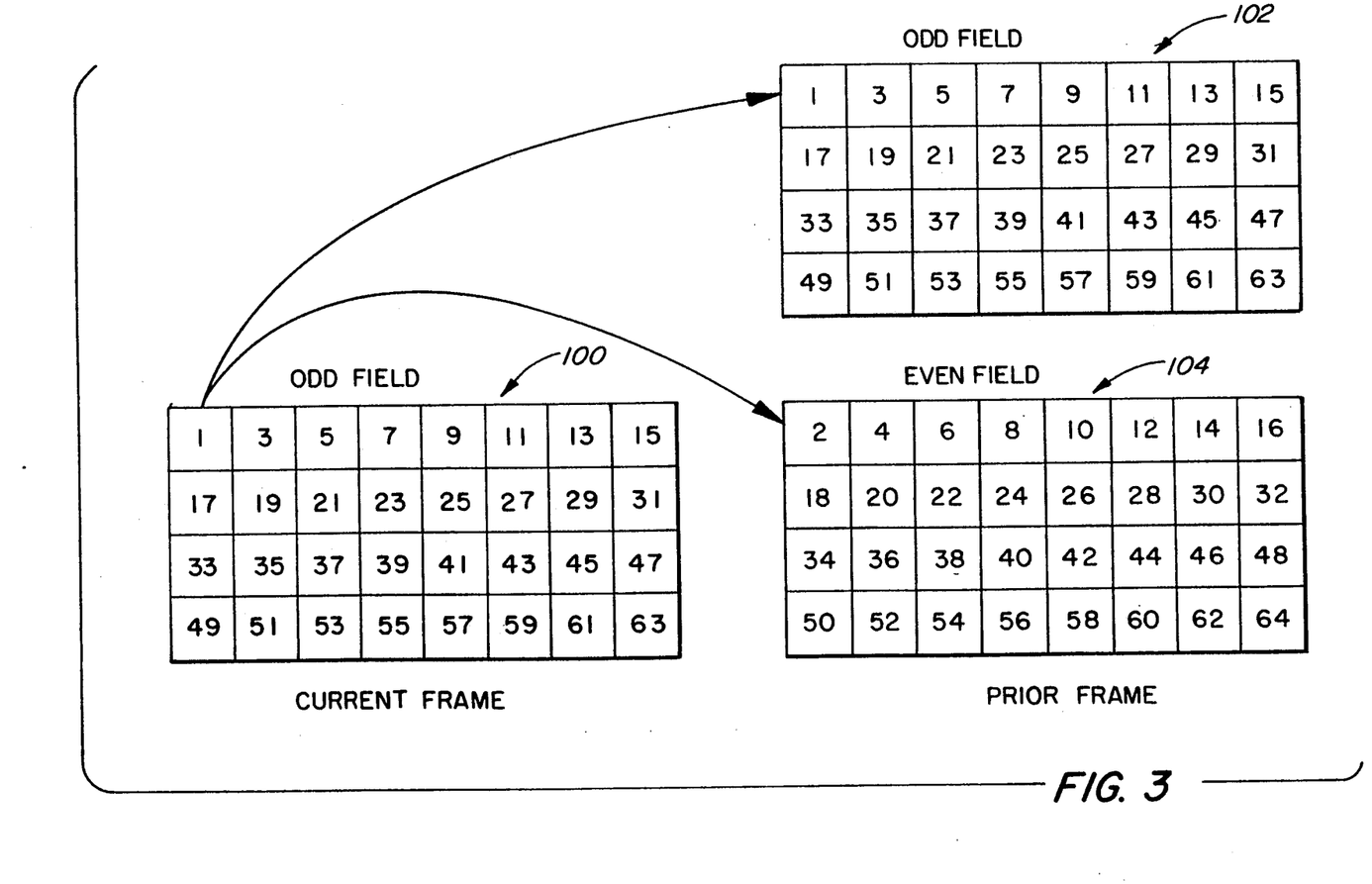
FIG. 3 is a diagram illustrating the comparison of a block from one field of a current frame to similarly situated blocks in two different fields of a prior frame.

The approach of the present invention is illustrated in FIG. 3. The odd field 100 of a current frame is divided into a plurality of odd field blocks, each containing pixel data. In a preferred embodiment, each block (e.g., block 1, 3, 5, ... etc.) is 8 pixels wide by 8 pixels high. Thus, each block contains a total of 64 pixels. Each block from odd field 100 of the current frame is compared to similarly situated blocks in both the odd field 102 and even field 104 of the prior frame. Thus, as illustrated in FIG. 3, block 1 of odd field 100 (current frame) is compared to block 1 of prior frame odd field 102 as well as to block 2 of even field 104 of the prior frame. Similarly, block 3 from odd field 100 will be compared to block 3 of odd field 102 as well as to block 4 of even field 104. The same double comparison is used for each block of odd field 100 of the current frame and for each block of the even field of the current frame (not shown).

It has been found that this double comparison technique improves compression efficiency. Depending on the frame-to-frame movement in a television picture, blocks from one field of a current frame might better match similarly situated blocks in the opposite field of the prior frame. The present invention takes advantage of this phenomenon.

In a preferred embodiment, a block from a current frame is compared to a range of similarly situated pixels in both the odd and even fields of the prior frame. The range of pixels can extend, for example, from −8 to +7 pixels from the center of a block in both the horizontal and vertical directions. Thus, each current frame block is tested $16^2$ times to find the best match in the prior frame odd field, and $16^2$ times to find the best match in the prior frame even field. A motion vector indicative of the best match overall is encoded to the transmitted "prediction error" data so that a decoder receiving the transmitted data can reconstruct the current block by retrieving the appropriate data from the prior frame received. The best match of a current frame block to a prior frame block can be ascertained by computing the sum of the absolute value of the pixel-to-pixel differences over the whole block for each test, and selecting the block of prior frame pixel data for which the sum is lowest.

Figure 4:
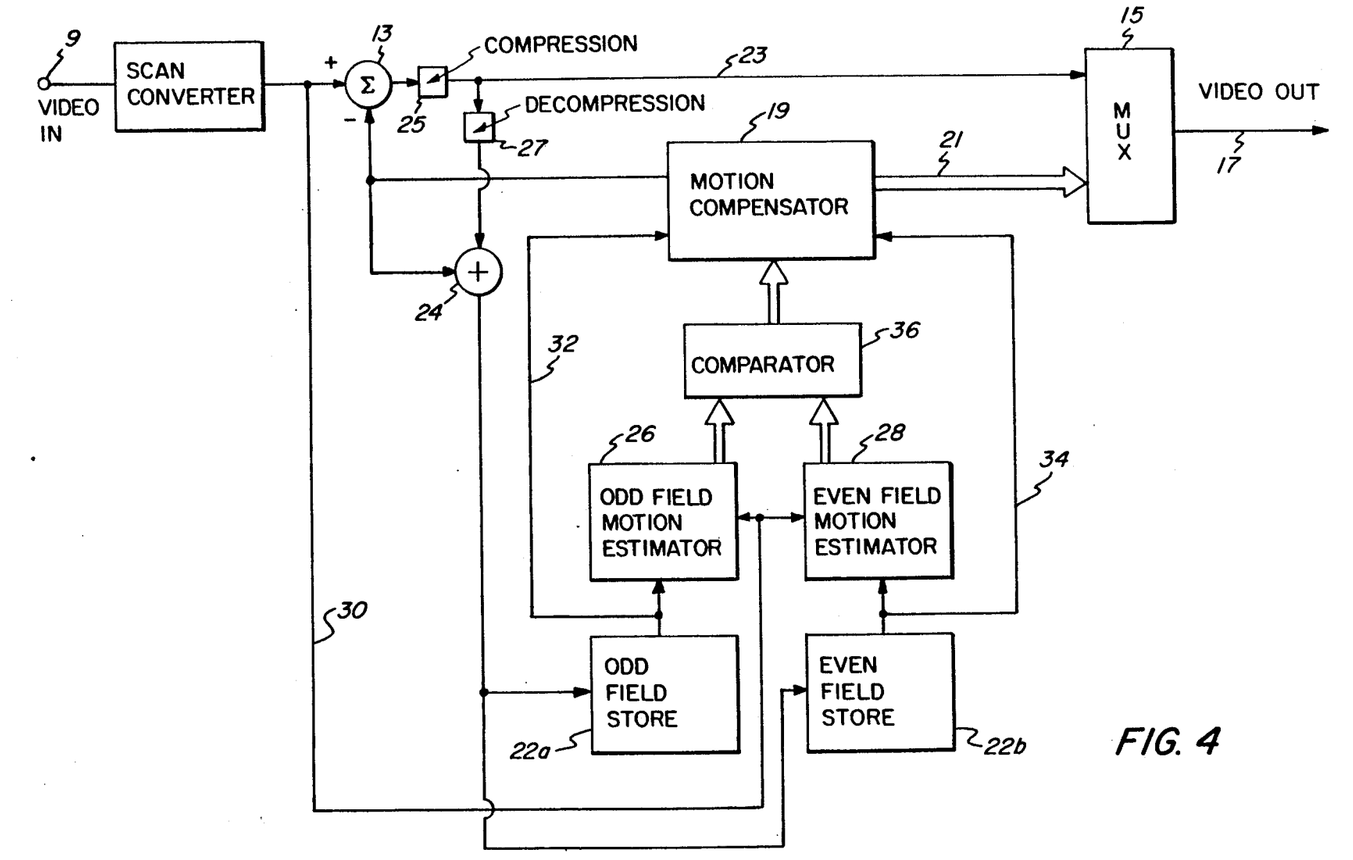
FIG. 4 is a block diagram of encoder apparatus in accordance with the present invention.

An encoder for use in connection with the present invention is illustrated in block diagram form in FIG. 4. An interlaced digital video signal is input at terminal 9. A scan converter 11 subdivides each video frame into blocks of odd field pixel data and even field pixel data. Such scan converters are well known in the art, and can comprise, for example, a series of counters that provide a read address to a dual port RAM into which the video signal is read.

The blocks of pixel data output from scan converter 11 are input via line 30 to an odd field motion estimator 26 and an even field motion estimator 28. Motion estimator 26 compares each received block to similarly situated data in the odd field of a prior frame. Similarly, motion estimator 28 compares each block of current frame pixel data to similarly situated data in the even field of the prior frame. The odd field data of the prior frame is stored in memory 22a. The even field data of the previous frame is stored in memory 22b. Those skilled in the art will appreciate that memory 22a and 22b can comprise a single random access memory (RAM) that stores all of the pixel data from the previous frame. Access to desired blocks of pixel data is obtained by well known memory addressing techniques. Thus, a block from a current video frame is compared to a range of similarly situated blocks in the prior frame by successively addressing the RAM to retrieve each prior frame block to be tested.

Odd field motion estimator 26 compares each current frame block to a range of similarly situated pixel data stored in odd field store 22a to determine the best match. Similarly, even field motion estimator 28 compares each current block to a range of similarly situated pixel data from even field store 22b to find the best match. Motion estimators 26, 28 then output motion vectors identifying the location of their respective best matches in the previous frame to a comparator 36 which determines which of the "best matches" is closest to the current frame block being processed. The motion vector of the overall best match is input to a motion compensator 19 that retrieves the corresponding block of data from odd field store 22a on line 32 or even field store 22b on line 34, and outputs the retrieved data to a conventional subtraction circuit 13. This circuit subtracts the retrieved best match prior frame data from the current block to provide a prediction error signal. Compression circuitry 25 is provided to compress the error signal data, using any of the well known compression algorithms, prior to transmission. The motion vector identifying the best matched data is output from motion compensator 19 on line 21, and appended to the compressed prediction error signal in a multiplexer 15 for output on line 17 to a transmitter.

Conventional decompression circuitry 27 is provided to decompress the compressed prediction error signal, which is then summed in an adder 24 with the retrieved best matched data from motion compensator 19. This reconstructs the current block for input to field store 22a or field store 22b, which stores the data for use as the prior frame data when the next frame is being processed.

Those skilled in the art will appreciate that the best match in the pixel domain (e.g., comparison of the respective current and prior frame sums of absolute values or sum of squares) may not always be the optimal criterion in comparing current frame to previous frame data. Other methods of choosing preferred counterparts between data in different frames or fields will be apparent. These include choosing counterparts with a differential error having the fewest number of bits after compression, or selecting those producing an error signal that suffers the least amount of degradation after compression and decompression.

Figure 5:
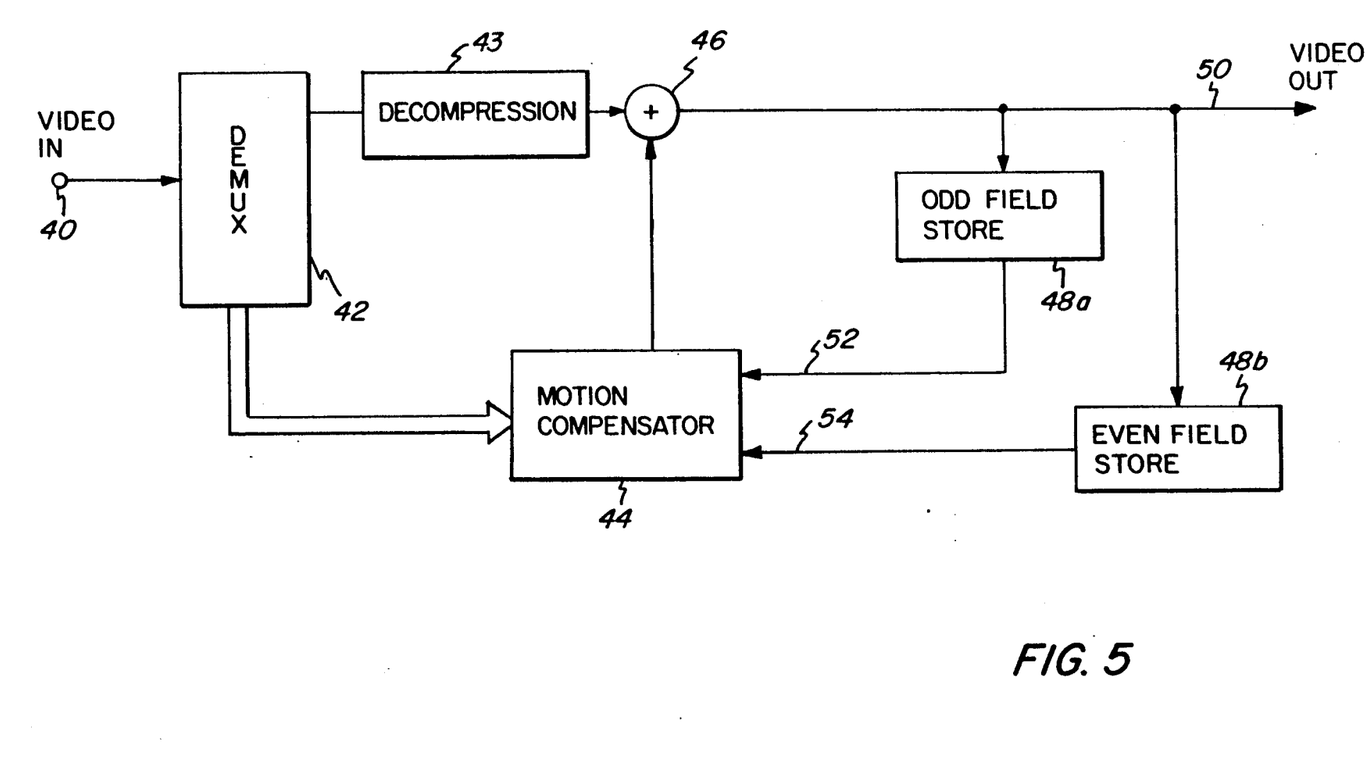
FIG. 5 is a block diagram of decoder apparatus in accordance with the present invention.

FIG. 5 illustrates a decoder than can be used to receive the encoded prediction error signals transmitted from the encoder of FIG. 4 and to reconstruct the original interlaced digital video signal. The encoded prediction error signal ("compressed data") is received at terminal 40, and separated in a demultiplexer 42 into the prediction error signal for input to an adder 46 and the motion vector data for input to a motion compensator 44. The prediction error signal is first decompressed by conventional decompression circuitry 43 that corresponds to compression circuitry 25 in the encoder. The motion vector data enables motion compensator 44 to retrieve the previous frame best match data from an odd field store 48a on line 52 or from an even field store 48b on line 54, as appropriate. The retrieved best match data is added back to the prediction error signal for the current block in conventional adder circuit 46, which outputs the reconstructed current block of pixel data on line 50. Those skilled in the art will appreciate that odd field store 48a and even field store 48b can comprise a single RAM that is addressed in a conventional manner to retrieve the appropriate best match pixel data.

Figure 6:
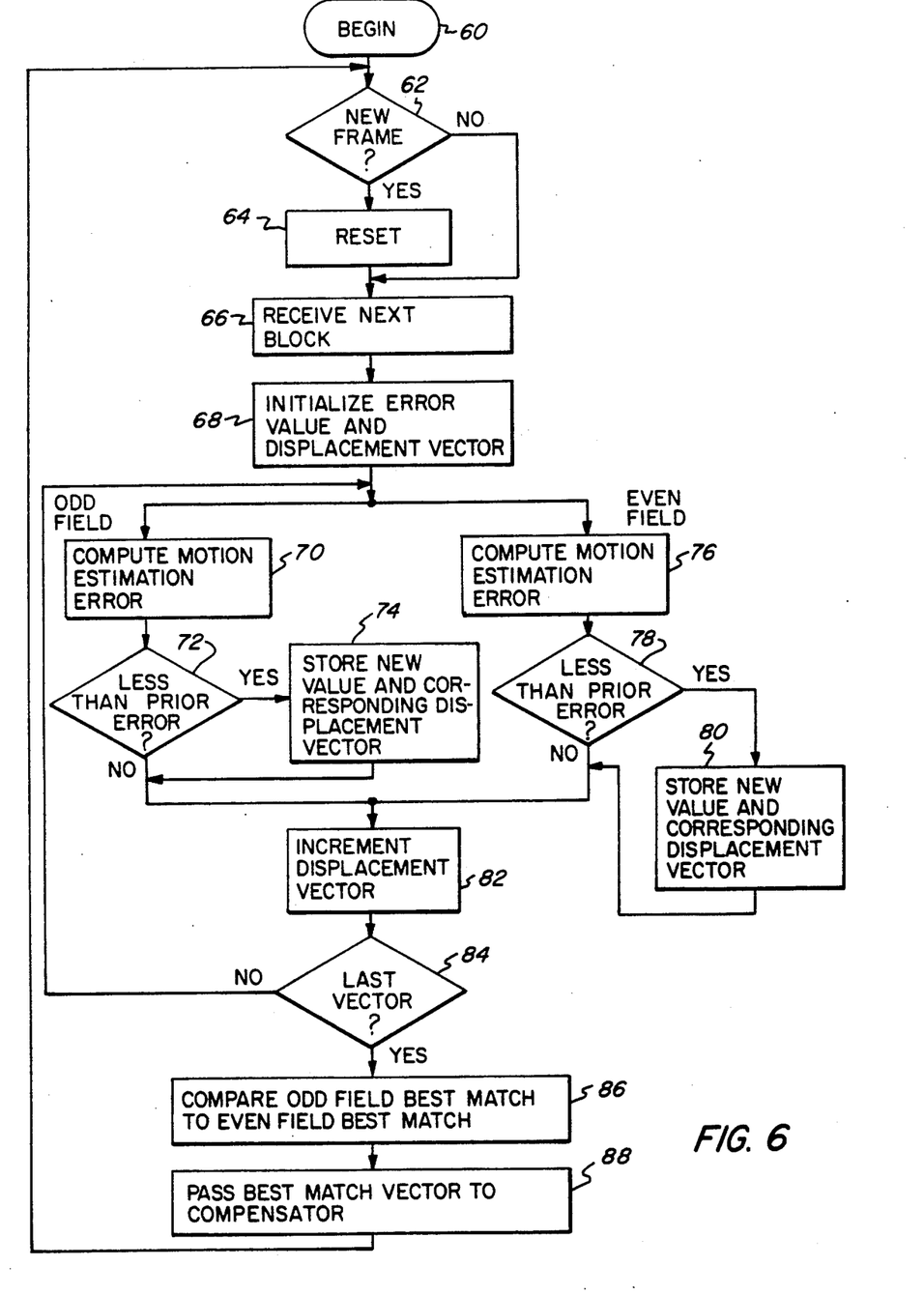
FIG. 6 is a flowchart illustrating a routine for selecting a prior frame block that best matches a current frame block.

FIG. 6 is a flowchart illustrating the encoding routine utilized by the encoder apparatus of FIG. 4. The routine begins at box 60, and at box 62 a determination is made as to whether a new video frame is being received. If so, the encoder is reset at box 64 as necessary to clear memories and reset counters that are used to keep track of the incoming video. At box 66, the next block of video data is received from scan converter 11. For each new block of current frame data, an error value and displacement vector are initialized at box 68. The error value is a number representing the difference between the block currently being processed and a block of previous frame pixel data to which the current block is being compared. At initialization, the error value is set to a high number. As the current block is successively compared to prior frame pixel data over a range, the error value is updated each time a match is found that is better than any prior match. The displacement vector is initialized at box 68 to a value (e.g., set of coordinates or a RAM address) that indicates the physical location of a similarly situated block in the previous video frame that the current block will first be compared to.

After the error value and displacement vector are initialized at box 68, processing splits off to two parallel paths. One path compares the current block to a range of similarly situated pixel data in the odd field of the prior video frame. The other path compares the current block to a range of similarly situated pixel data in the even field of the prior frame. At box 70, the motion estimation error is computed by motion estimator 26 to determine how well the current block matches the pixel data of the prior frame represented by the current displacement vector. At box 72, a determination is made as to whether the match is better or worse than any previous match for the current block within the odd field of the prior frame. If the error between the current block and the prior frame pixel data being tested is less than any such error previously determined for the current block, control passes to box 74 where the new error value is stored together with the current displacement vector. Similar processing for the even field of the prior frame takes place at boxes 76, 78, and 80.

After the current block is compared to similarly situated pixel data in both the odd and even fields of the prior frame, as defined by the current displacement vector, the displacement vector is incremented at box 82 so that comparisons can continue to be made throughout the range of pixel data to be tested. At box 84, a determination is made as to whether the last displacement vector within the range has been reached. If not, the routine loops back to the beginning of the parallel paths so that each current frame block can be tested against the prior frame odd and even field data throughout the entire range. When the last vector has been reached, control passes to box 86 for the final comparison provided by comparator 36. The best match found between the current block and the odd field of the previous frame is compared to the best match found between the current block and the even field of the previous frame. The overall best match is determined, and at box 88 the motion vector identifying the previous frame data corresponding to the best overall match is passed to motion compensator 19. The routine then continues on a block-by-block basis for all the frames of a television program.

Figure 7:
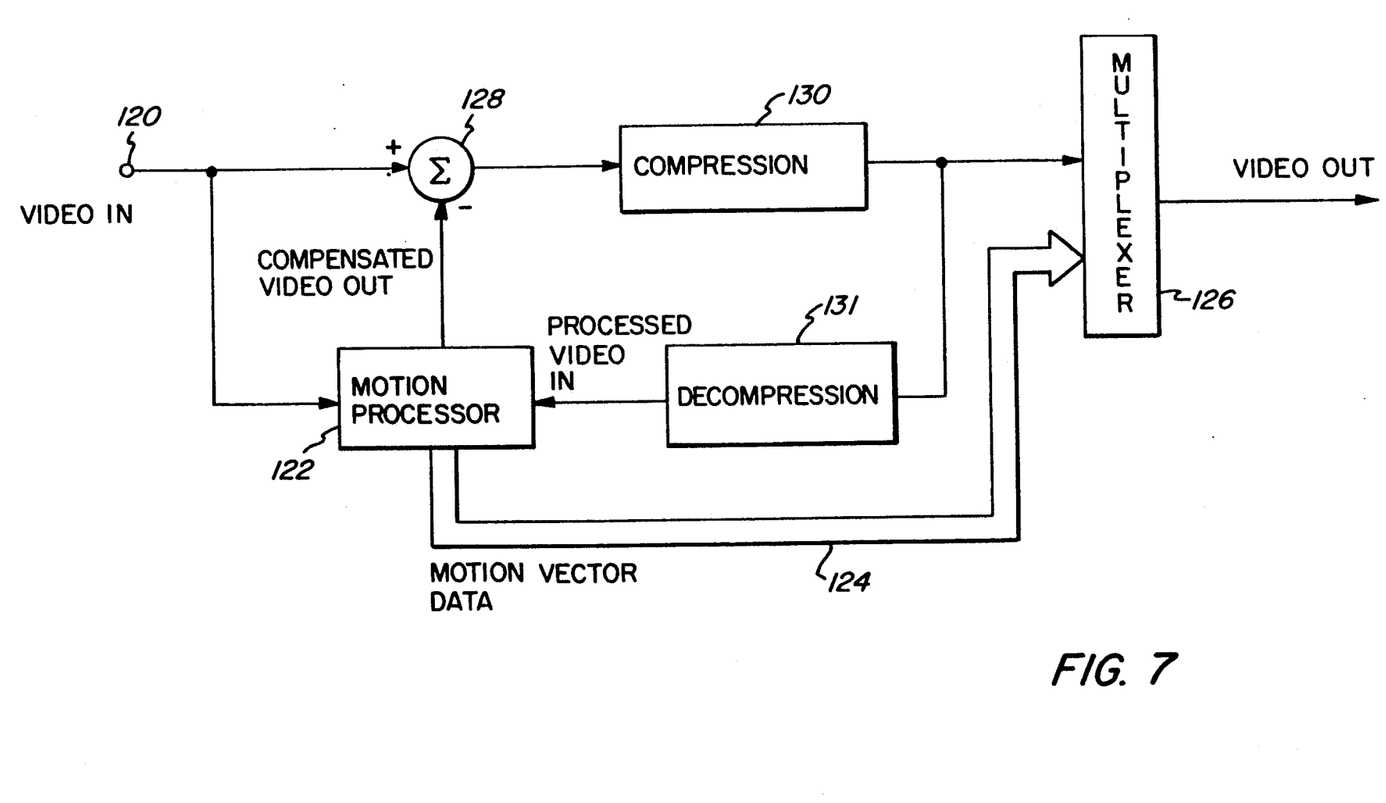
FIG. 7 is a block diagram of another embodiment of encoder apparatus in accordance with the present invention.
Figure 8:
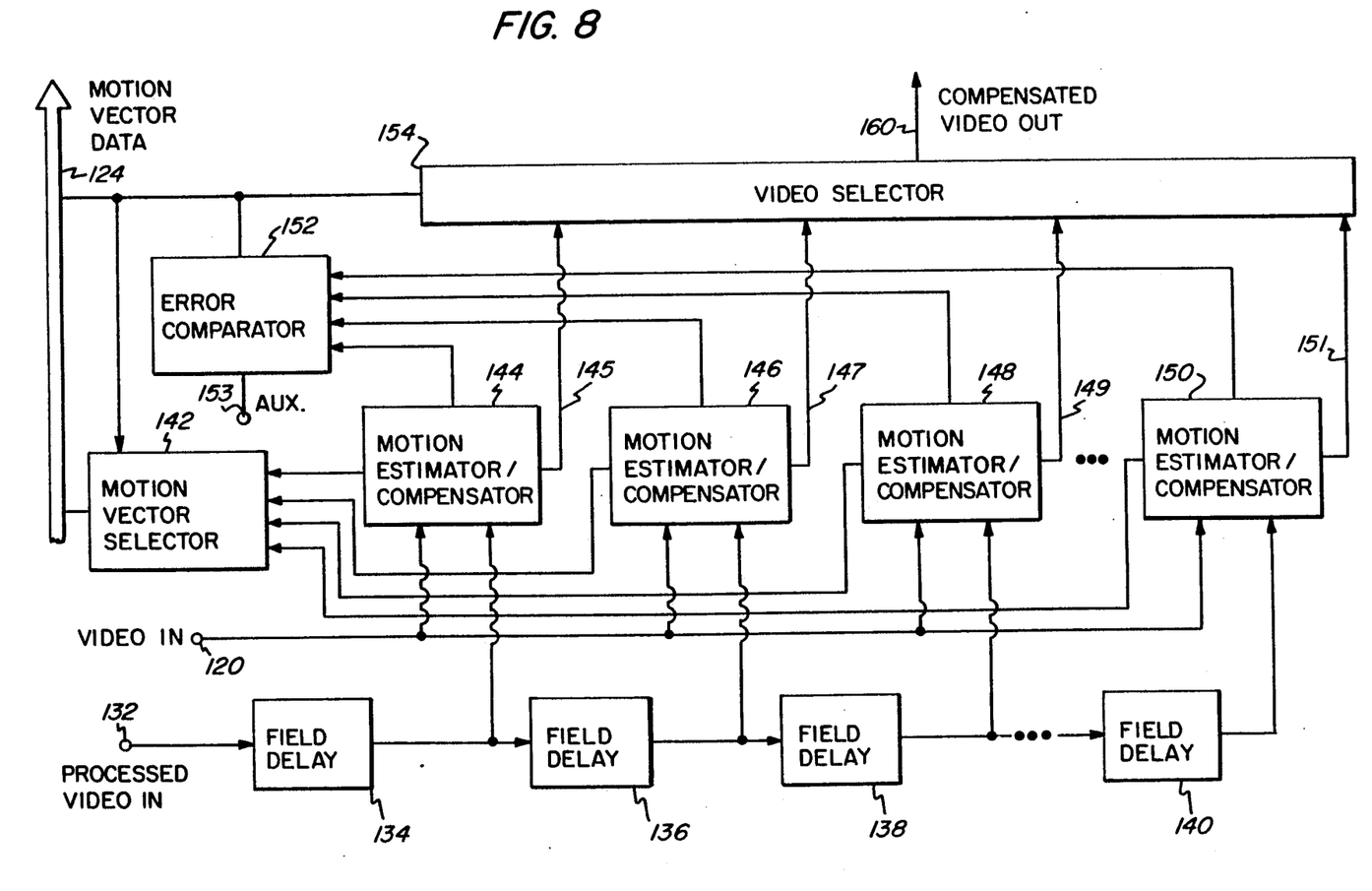
FIG. 8 is a detailed block diagram of the motion processor component illustrated in FIG. 7.

FIGS. 7 and 8 depict another embodiment of the present invention wherein pixel data from a current field is compared to similarly situated pixel data in a plurality of prior fields. A comparison with any number of prior fields can be accommodated.

In FIG. 7, a digital video signal is input at terminal 120 and coupled to a motion processor 122 shown in greater detail in FIG. 8. Motion processor 122 compares a set of pixel data from the current video field input at terminal 120 to a similarly situated set of pixel data from each of a plurality of previous video fields to find a preferred counterpart (e.g., best match) for the current set from one of the previous fields. The motion processor then generates an output signal which is subtracted at summer 128 from the input video signal to produce a prediction error signal indicative of the difference between the current set of pixel data and its preferred counterpart. This signal is compressed at compression stage 130 and input to a multiplexer 126. Compression stage 130 may comprise, for example, well known DCT and/or Huffmann coding algorithms. A decompression stage 131 is required to return the processed video data to its decompressed state prior to inputting it to motion processor 122. Multiplexer 126 combines the compressed motion compensated signal with motion vector data output on line 124 from motion processor 122. It will be appreciated that field identifier data is also output on line 124 for combination with the compressed motion compensated signal to identify the previous field in which the preferred counterpart is located.

Motion processor 122 can be implemented as depicted in FIG. 8. The processed video signal output from decompression stage 131 is input at terminal 132 and coupled to a series of field delay circuits 134, 136, 138 . . . 140 that store a plurality of previous video fields for subsequent comparison with a current set of video field data. The video signal input at terminal 120 is compared with the previous field pixel data. The comparison for each stage is made in a corresponding motion estimator/compensator 144, 146, 148 . . . 150. Each of the motion estimator/compensators outputs an error signal that specifies an amount of error between the current video field pixel data and the previous field pixel data to which it is compared in the particular motion estimator/compensator. The error signals are all input to an error comparator 152, which determines which motion estimator/compensator is outputting the preferred (e.g., least) error. An auxiliary input terminal 153 enables selection between the various motion estimator/compensators. As indicated above, the preferred counterpart can be the best match, the error signal having the fewest bits after compression, the error signal having the least degradation after compression and decompression, or the error signal meeting another desired criterion.

Error comparator 152 outputs a control signal which actuates a video selector 154 to output the compensated video signal from the motion estimator/compensator that produced the preferred error. The compensated video output on line 160 comprises the selected signal from line 145, 147, 149, or 151 of the appropriate motion estimator/compensator.

Each motion estimator/compensator also outputs motion vector and field identifier data specifying the location within that previous field where the preferred counterpart for the current field data is found. The control signal from error comparator 152 actuates motion vector selector 142 to output the proper motion vector data to line 124.

The motion processor circuitry of FIG. 8 can accommodate any number of field delays so that pixel data from a current video field can be compared to similarly situated sets of pixel data from each of a plurality of previous video fields. In this manner, a preferred counterpart for the current set can be found from any one of a number of previous fields. The previous fields can be consecutive previous fields, or otherwise organized in accordance with the particular application involved.

It should now be appreciated that the present invention provides an improved method of motion compensation for interlaced digital video signals. Pixel data from the fields of a current frame is compared to similarly situated pixel data in a plurality of prior fields. A preferred counterpart from a prior field is found for the current pixel data and used for the compression process.

In this manner, higher compression efficiencies are achieved.

Although the invention has been described in connection with a preferred embodiment thereof, those skilled in the art will appreciate that numerous modifications and adaptations may be made thereto without departing from the spirit and scope of the invention as set forth in the following claims.

What is claimed is:

1. A method for motion compensated coding of interlaced digital video signals comprising the steps of:
    subdividing the odd field of a first interlaced video frame into blocks of odd field pixel data;
    subdividing the even field of said first video frame into blocks of even field pixel data;
    subdividing the odd field of a subsequent second interlaced video frame into blocks of odd field pixel data;
    subdividing the even field of said second video frame into blocks of even field pixel data;
    comparing each block of pixel data from the second video frame to similarly situated blocks in both the odd and even fields of said first video frame to find a preferred first frame counterpart for each second frame block; and
    generating a prediction error signal for each second frame block indicative of the difference between the block and its preferred counterpart.

2. The method of claim 1 comprising the further step of:
    compressing and subsequently decompressing the block of pixel data for the preferred counterpart prior to said generating step, wherein the decompressed preferred counterpart data is used in generating said prediction error signal.

3. The method of claim 2 comprising the further step of:
    encoding each prediction error signal with data indicative of the location of said preferred counterpart in the first video frame.

4. The method of claim 2 wherein said comparing step compares each second frame block over a range of similarly situated pixels in both the odd and even fields of said first video frame.

5. The method of claim 4 comprising the further step of:
    encoding each prediction error signal with data indicative of the location of said preferred counterpart in the first video frame.

6. The method of claim 5 wherein said encoding data comprises a field identifier and motion vectors.

7. The method of claim 2 comprising the further step of compressing said prediction error signal for transmission.

8. Encoder apparatus for motion compensated coding of interlaced digital video signals comprising:
    means for subdividing successive interlaced video frames into blocks of odd field and even field pixel data;
    means for storing the odd field blocks and even field blocks of a first video frame;
    means coupled to said storing means for comparing each block of pixel data from a subsequent second video frame to stored similarly situated blocks in both the odd and even fields of said first video frame to find a preferred first frame counterpart for each second frame block; and
    means for generating a prediction error signal for each second frame block indicative of the difference between the block and its preferred counterpart after the preferred counterpart data has been compressed and subsequently decompressed.

9. Apparatus in accordance with claim 8 further comprising:
    means for encoding each prediction error signal with data indicative of the location of said preferred counterpart in the first video frame.

10. Apparatus in accordance with claim 8 wherein said comparing means compares each second frame block over a range of similarly situated pixels in both the odd and even fields of said first video frame.

11. Apparatus in accordance with claim 10 further comprising:
    means for encoding each prediction error signal with data indicative of the location of said preferred counterpart in the first video frame.

12. Apparatus in accordance with claim 11 wherein said encoding data comprises a field identifier and motion vectors.

13. Apparatus in accordance with claim 8 further comprising:
    means for compressing said prediction error signal for transmission.

14. Decoder apparatus for decoding motion compensated interlaced digital video signals comprising:
    memory means for storing odd field and even field pixel data for a first video frame;
    means for receiving motion compensated blocks of odd field pixel data and motion compensated blocks of even field pixel data for a second video frame, each of said second frame blocks having a motion vector appended thereto relating the block to corresponding pixel data in said first video frame;
    means responsive to the motion vectors for retrieving odd field or even field pixel data from said memory means for each odd field second frame block;
    means responsive to the motion vectors for retrieving odd field or even field pixel data from said memory means for each even field second frame block; and
    means for adding the retrieved first frame pixel data to the corresponding second frame block to reconstruct full blocks of pixel data defining the second video frame;
    wherein the reconstruction of each second frame block is not limited to the use of first frame pixel data from the same field as the block being reconstructed.

15. Decoder apparatus in accordance with claim 14 further comprising:
    means for decompressing the received motion compensated blocks of data.

16. A method for motion compensated coding of digital video signals comprising the steps of:
    comparing a set of pixel data from a current video field to a similarly situated set of pixel data from each of a plurality of previous video fields to find a preferred counterpart for the current set from one of the previous fields; and
    generating a prediction error signal for the current set of pixel data indicative of the difference between the current set and its preferred counterpart.

17. The method of claim 16 comprising the further step of:

compressing and subsequently decompressing the set of pixel data for the preferred counterpart prior to said generating step, wherein the decompressed preferred counterpart data is used in generating said prediction error signal.

18. The method of claim 17 comprising the further step of:
encoding the prediction error signal with data indicative of the previous field in which said preferred counterpart is located.

19. The method of claim 17 wherein said comparing step compares said current set of pixel data over a range of similarly situated pixels in each previous field to find the preferred counterpart.

20. The method of claim 18 comprising the further step of:
encoding the prediction error signal with data indicative of where said preferred counterpart is located.

21. The method of claim 20 wherein said location data comprises a field identifier and motion vector data.

22. The method of claim 20 wherein each of said steps is repeated for successive sets of pixel data from successive current fields.

23. The method of claim 17 wherein said preferred counterpart is the set of pixel data from one of the plurality of previous fields that best matches the current set of pixel data.

24. The method of claim 17 wherein said preferred counterpart is the set of pixel data from one of the plurality of previous fields that, when compared with the current set of pixel data, produces a prediction error signal that has the fewest number of bits after compression.

25. The method of claim 17 wherein said preferred counterpart is the set of pixel data from one of the plurality of previous fields that, when compared with the current set of pixel data, produces a prediction error signal that suffers the least amount of degradation after compression and decompression.

26. The method of claim 17 comprising the further step of compressing said prediction error signal for transmission.

27. Encoder apparatus for motion compensated coding of digital video signals comprising:
means for comparing a set of pixel data from a current video field to a similarly situated set of pixel data from each of a plurality of previous video fields to find a preferred counterpart for the current set from one of the previous fields; and
means responsive to said comparing means for outputting a prediction error signal for the current set of pixel data indicative of the difference between the current set and its preferred counterpart after the preferred counterpart data has been compressed and subsequently decompressed.

28. Apparatus in accordance with claim 27 further comprising:
means for encoding the prediction error signal with data indicative of the previous field in which said preferred counterpart is located.

29. Apparatus in accordance with claim 27 wherein said comparing means compares said current set of pixel data over a range of similarly situated pixels in each previous field to find the preferred counterpart.

30. Apparatus in accordance with claim 29 further comprising:
means for encoding the prediction error signal with data indicative of where said preferred counterpart is located.

31. Apparatus in accordance with claim 30 wherein said locating data comprises a field identifier and motion vector data.

32. Apparatus in accordance with claim 27 wherein said preferred counterpart is the set of pixel data from one of the plurality of previous fields that best matches the current set of pixel data.

33. Apparatus in accordance with claim 27 wherein said preferred counterpart is the set of pixel data from one of the plurality of previous fields that, when compared with the current set of pixel data, produces a prediction error signal that has the fewest number of bits after compression.

34. Apparatus in accordance with claim 27 wherein said preferred counterpart is the set of pixel data from one of the plurality of previous fields that, when compared with the current set of pixel data, produces a prediction error signal that suffers the least amount of degradation after compression and decompression.

35. Apparatus in accordance with claim 27 further comprising:
means for compressing said prediction error signal for transmission.

36. Decoder apparatus for decoding motion compensated digital video signals comprising:
memory means for storing pixel data from each of a plurality of prior video fields;
means for receiving a motion compensated set of pixel data for a current video field having a field identifier appended thereto relating said set to a predetermined counterpart in one of said plurality of prior video fields;
means responsive to said field identifier for retrieving said counterpart from said memory means; and
means for reconstructing a full set of pixel data defining a current video field portion from said motion compensated set of pixel data and said retrieved counterpart;
wherein successive full sets of pixel data can be reconstructed from successive current field motion compensated sets having respective counterparts in different prior video fields.

37. Decoder apparatus in accordance with claim 36 wherein said retrieving means obtains said counterpart using motion vector data contained in said field identifier.

38. Decoder apparatus in accordance with claim 36 further comprising:
means for decompressing the received motion compensated set of pixel data.

* * * * *